(12) United States Patent
Emmanuel et al.

(10) Patent No.: US 10,785,704 B1
(45) Date of Patent: Sep. 22, 2020

(54) BAND EDGE PERFORMANCE OPTIMIZATION TECHNOLOGY FOR ORTHOGONAL FREQUENCY-DIVISION MODULATION (OFDM) BASED RADIOS

(71) Applicant: Amazon Technologies, Inc., Seattle, WA (US)

(72) Inventors: Cyril Arokiaraj Arool Emmanuel, Cupertino, CA (US); Gokul Ramsubbaraj, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 16/212,464

(22) Filed: Dec. 6, 2018

(51) Int. Cl.
| | |
|---|---|
| H04W 48/06 | (2009.01) |
| H04B 17/382 | (2015.01) |
| H04B 17/336 | (2015.01) |
| H04W 48/16 | (2009.01) |
| H04L 27/26 | (2006.01) |
| H04B 17/327 | (2015.01) |
| H04L 5/00 | (2006.01) |
| H04J 11/00 | (2006.01) |
| H04W 72/04 | (2009.01) |

(52) U.S. Cl.
CPC .......... *H04W 48/06* (2013.01); *H04B 17/327* (2015.01); *H04B 17/336* (2015.01); *H04B 17/382* (2015.01); *H04J 11/00* (2013.01); *H04L 5/0007* (2013.01); *H04L 27/265* (2013.01); *H04W 48/16* (2013.01); *H04W 72/0453* (2013.01); *H04J 2011/0009* (2013.01)

(58) Field of Classification Search
None
See application file for complete search history.

(56) References Cited

U.S. PATENT DOCUMENTS

| | | | |
|---|---|---|---|
| 2019/0123702 A1* | 4/2019 | Trainor | H03G 3/001 |
| 2020/0015177 A1* | 1/2020 | Kim | H04L 27/26 |

* cited by examiner

Primary Examiner — Christine T Duong
(74) Attorney, Agent, or Firm — Lowenstein Sandler LLP (57) ABSTRACT

Technologies to improve band edge channel performance for radios are described. One device includes a baseband processor with an Orthogonal Frequency Division Multiplexing (OFDM) physical layer (PHY) parameter structure. The OFDM PHY layer parameter structure includes first parameter information that controls operation of an OFDM PHY in a first mode. The baseband processor establishes a wireless communication link with a second device and transmits first data to the second device in the first mode using a transmit power level. The baseband processor determines that the device is connected with the second device on a band edge channel that is adjacent to a restricted frequency band. The baseband processor modifies the first parameter information to second parameter information, the second parameter information controls operation of the OFDM PHY in a second mode. The baseband processor transmits second data to the second device in the second mode using the transmit power level.

20 Claims, 6 Drawing Sheets

| 300 ⤵ | 802.11a OFDM PHY Parameters | |
|---|---|---|
| | BW | 20 MHZ |
| | OBW | 16.6 MHZ |
| | Subcarrier Spacing | 312.5 Khz (20MHz/64 Pt FFT) |
| | Information Rate | 6/9/12/18/24/36/48/54 Mbits/s |
| | Modulation | BPSK, QPSK, 16QAM, 64QAM |
| 302 ⤵ | Coding Rate | 1/2, 2/3, 3/4 |
| 306 ⤵ | Total Subcarriers | 52 (Frequency Index -26 to +26) |
| 304 ⤵ | Data Subcarriers | 48 → 24  (310) |
| 308 ⤵ | Pilot Subcarriers | 4 (-21, -7, +7, +21) *Always BPSK |
| | DC Subcarrier | Null (0 subcarrier)  (312) |

FIG. 3A

| 340 ⤵ | 802.11a OFDM PHY Parameters | |
|---|---|---|
| 342 ⤵ | BW | 20 MHZ → 10 MHz |
| 344 ⤵ | OBW | 16.6 MHZ → 8.3 MHz |
| | Subcarrier Spacing | 312.5 Khz (20MHz/64 Pt FFT) |
| | Information Rate | 6/9/12/18/24/36/48/54 Mbits/s |
| | Modulation | BPSK, QPSK, 16QAM, 64QAM |
| | Coding Rate | 1/2, 2/3, 3/4 |
| | Total Subcarriers | 52 (Frequency Index -26 to +26) |
| | Data Subcarriers | 48 |
| | Pilot Subcarriers | 4 (-21, -7, +7, +21) *Always BPSK |
| | DC Subcarrier | Null (0 subcarrier) |

BAND EDGE PERFORMANCE OPTIMIZATION TECHNOLOGY FOR ORTHOGONAL FREQUENCY-DIVISION MODULATION (OFDM) BASED RADIOS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present embodiments will be understood more fully from the detailed description given below and from the accompanying drawings of the present disclosure, which, however, should not be taken to limit the present embodiments, but are for explanation and understanding only.

FIG. 3A illustrates a table of an OFDM PHY parameter structure, including a set of subcarriers in a first mode and a subset of subcarriers in a second mode according to one embodiment.

FIG. 3B illustrates a table of an OFDM PHY parameter structure, including a first value of a minimum channel bandwidth in a first mode and a second value of the minimum channel bandwidth in a second mode according to one embodiment.

DETAILED DESCRIPTION

Technologies to improve band edge channel performance for radios are described. One device includes a baseband processor with an Orthogonal Frequency Division Multiplexing (OFDM) physical layer (PHY) parameter structure. The OFDM PHY parameter structure includes first parameter information that controls operation of an OFDM PHY (also revered to as OFDM PHY layer) in a first mode. The baseband processor establishes a wireless communication link with a second device and transmits first data to the second device in the first mode using a transmit power level. The baseband processor determines that the device is connected with the second device on a band edge channel that is adjacent to a restricted frequency band. The baseband processor modifies the first parameter information to second parameter information, the second parameter information to control operation of the OFDM PHY in a second mode. The baseband processor transmits transmit second data to the second device in the second mode using the transmit power level.

The 2.4 GHz and 5 GHz industrial, scientific, and medical (ISM) radio bands allow unlicensed wireless communications. Due to its unlicensed nature, many short ranged, low power wireless communication systems operate in these frequency bands. Although the 2.4 GHz and 5 GHz bands are unlicensed, adjacent frequency bands are restricted by the Federal Communications Commission (FCC) in the United States. For example, in order to be compliant with FCC regulatory requirements, wireless local area network (WLAN) radios operating in the 2.4 GHz and 5 GHz UNII-1 bands are often limited in transmitter output power when operating in band edge channels, including channel 1 and 11 in the 2.4 GHz band and channel 36 and 64 in the 5 GHz band. For example, the FCC regulatory requirements include a band edge requirement that specifies that out-of-band emissions in a restricted frequency band do not exceed 54 dBuV/m as an average limit and 74 dBuV/m as a peak limit. This requirement may translate into a conducted transmit power (Tx power) of −41 dBm at antenna ports. The following table, Table 1, includes the FCC restricted bands and the low, mid, and high channels for the 2.4 GHz frequency band and the 5 GHz frequency band.

TABLE 1

| FCC Restricted Band | 2.4 GHZ WLAN LOW, MID and HIGH CHANNELS | | | FCC Restricted Band |
|---|---|---|---|---|
| | CHANNEL-1 | CHANNEL-6 | CHANNEL-11 | |
| 2310 MHz-2390 MHz | 2412 MHz | 2437 MHz | 2462 MHz | 2483.5 MHz-2500 MHz |
| FCC Restricted Band | 5 GHZ UNII-1 BAND WLAN LOW, MID and HIGH CHANNELS | | | FCC Restricted Band |
| | CHANNEL-36 | CHANNEL-48 | CHANNEL-64 | |
| 4500 MHz-5150 MHz | 5180 MHz | 5240 MHz | 5320 MHz | 5350 MHz-5470 MHz |

The limitation on the transmitter's output power in the band edge channels (e.g., 1, 11, 36 and 64 channels) manifests from a combination of factors, including a power amplifier non-linearity, a type of modulation scheme, and a bandwidth of the WLAN signals. Increasing the fundamental transmitter power beyond a linear operating range of the power amplifier used in a transmit chain can cause spectral regrowth, which increases the out-of-band emissions. OFDM is a multicarrier modulation scheme used in 802.11 WLAN applications. Due to the high Peak-to-Average Power Ratio (PAPR) level of OFDM signals, signal distortion occurs when peak signals pushes the power amplifier into its non-linear region that results in intermodulation distortion due to closely spaced OFDM subcarriers. The intermodulation distortion causes spectral regrowth and also increases out-of-band emissions, such as in the form of spurs or harmonics. Some WLAN signals (e.g., IEEE 802.11g/a/n signals) use a channel bandwidth of 20 MHz, where 16.25 MHz is occupied by signal subcarriers, and other WLAN signals (e.g., IEEE 802.11n) use a channel bandwidth of 40

MHz, where 33.75 MHz is occupied by signal subcarriers. Such wideband OFDM signals originating from baseband domain can create higher spectral regrowth when the baseband signals are fed into a radio frequency (RF) section of a transmitter chain where the non-linearity of the power amplifier dominates. This spectral regrowth caused by the wideband OFDM signals can increase the out-of-band emissions.

In some cases, when the fundamental transmitter power is limited in band edge channels (e.g., channels 1, 11, 36, and 64 in the 2.4 GHz and 5 GHz frequency bands) because of the band edge restrictions, the client devices are limited in range for the WLAN radios to operate in the band edge channels. This can result in poor user experience in scenarios where the client device is located far away from an access point or in scenarios where the client device is forced to operate in the band edge channels because of increased congestion in middle channels. There are other scenarios that may cause the client device to operate in the band edge channels, which may result in poor user experience.

The embodiments described herein can improve the user experience by improving performance of the client device when the client device is connected to an access point in a band edge channel. The embodiments described below set forth various solutions, including a solution using OFDM subcarrier nulling in the baseband domain, a solution using dynamic power amplifier biasing in the RF domain, a solution using reduced bandwidth operations in the baseband domain, and the like.

Although various embodiments are described below with respect to WLAN technologies, such as the Wi-Fi® technology, the embodiments described herein can be used in other wireless technologies, such as personal area network (PAN) technologies (e.g., Bluetooth® and Zigbee® technologies), wireless area network (WAN) technologies, such as cellular technologies including Long Term Evolution (LTE) frequency bands, fourth generation (4G) frequency bands, or the like. Similarly, although various embodiments are described below with respect to OFDM, the embodiments described herein can be used in connection with other multi-carrier modulation schemes, as well as other multi-channel communication systems in which non-linearity of the power amplifier can impact undesired out-of-band emissions into other adjacent frequency bands.

Figure 1:
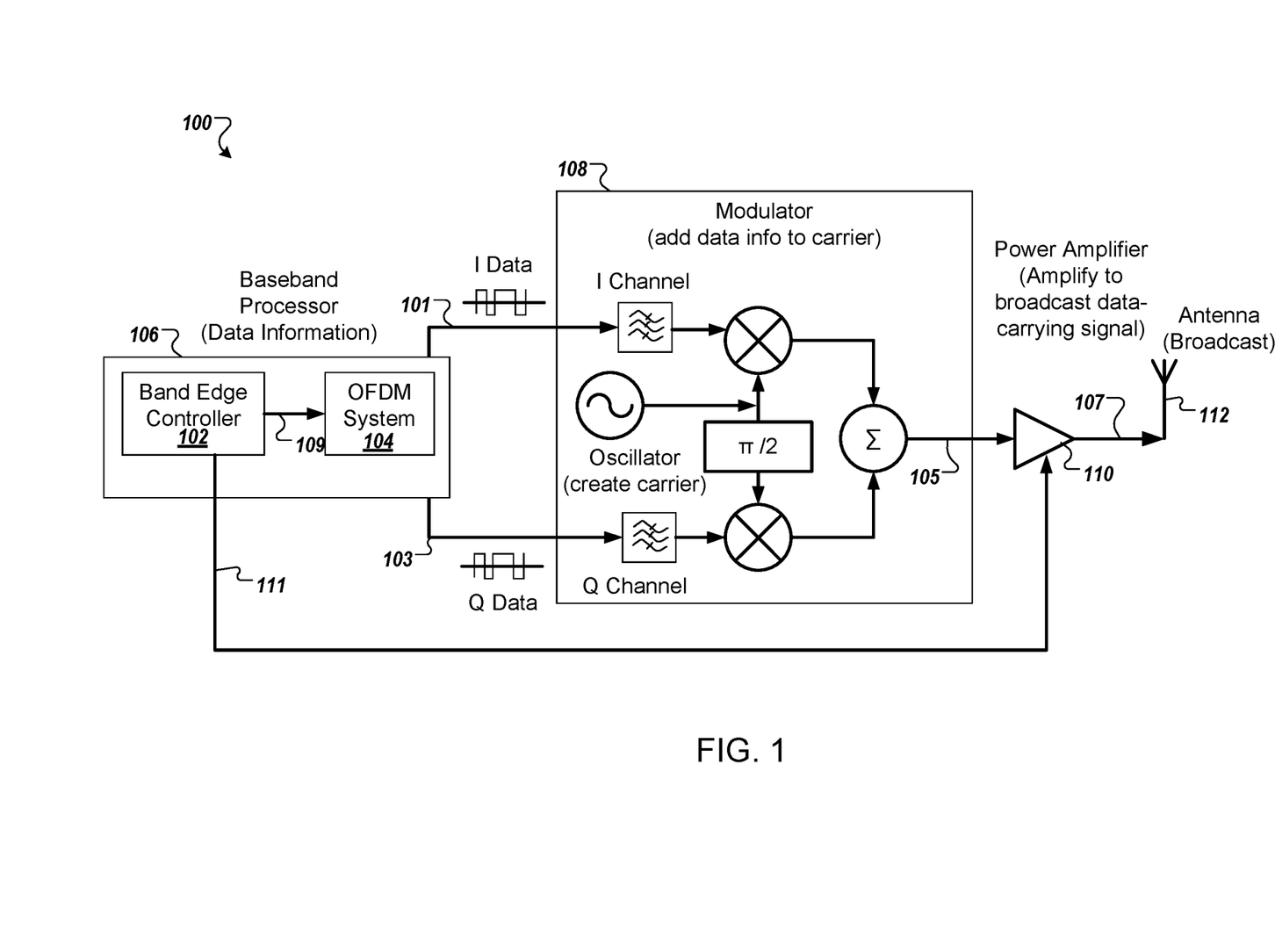
FIG. 1 is a block diagram of an electronic device with a band edge controller to improve band edge performance of an OFDM system according to one embodiment.

FIG. 1 is a block diagram of an electronic device 100 with a band edge controller 102 to improve band edge performance of an OFDM system 104 according to one embodiment. The electronic device 100 includes a baseband processor 106, including the band edge controller 102 and the OFDM system 104. The electronic device also includes a modulator 108, a power amplifier 110, and an antenna 112.

The OFDM system 104 includes a digital signal processing logic (e.g., hardware, software, or any combination thereof) that implements a digital multi-carrier modulation scheme—OFDM scheme. The OFDM scheme extends the concept of a single subcarrier modulation by using multiple subcarriers within a same single channel. Rather than transmitting a high-rate stream of data with a single subcarrier, OFDM uses a number of closely spaced orthogonal subcarriers that are transmitted in parallel. Each subcarrier is modulated with a digital modulation scheme, such as QPSK, 16QAM, etc.) at a low symbol rate. The combination of many subcarriers enables similar data rates as single-carrier modulation schemes with similar bandwidths. In the OFDM system 104, different streams of information are mapped onto separate parallel frequency channels, each channel being separated from the others by a frequency guard band to reduce interference between adjacent channels. So, in OFDM system 104, multiple subcarriers carry the information stream and the subcarriers are orthogonal to each other and the guard interval is added to each symbol to minimize the channel delay spread and inter-symbol interference. In the digital domain, the OFDM system 104 can map digital modulated input data, referred to as data symbols, onto orthogonal subcarriers. The data symbols are frequency-domain input data, such as complex numbers represented the modulated subcarriers), and the OFDM system 104 converts the data symbols to the time-domain output data that represent the analog OFDM symbol waveforms. In the illustrated embodiment, the OFDM system 104 outputs the OFDM symbol waveforms as I data 101 and Q data 103.

In general, the modulator 108 receives the output data from the OFDM system 104, modulates the output data to add the output data to a carrier signal to obtain a data-carrying signal 105. The data-carrying signal 105 is output by the modulator 108 to the power amplifier 110 that amplifies the data-carrying signal 105 to broadcast the data-carrying signal 105 as an RF signal 107 via the antenna 112.

The baseband processor 106 includes the band edge controller 102. The band edge controller 102 can determine that the electronic device 100 is connected to another device, such as an access point, on a band edge channel of a wireless communication link. When the electronic device 100 is connected on the band edge channel, the band edge controller 102 can implement one or more technical solutions to improve performance of the wireless link while connected on the band edge channel, while complying with band edge compliance requirements.

In one embodiment, the band edge controller 102 can provide control information 109 (e.g., control signals, instructions, commands, or the like) to the OFDM system 104 to modify parameters of an OFDM parameter structure that controls operations of the OFDM system 104. For example, the OFDM parameter structure can specify first parameter information that controls operation of the OFDM system 104 in a first mode, such as when the electronic device 100 is connected to the access point on a middle channel (or any non-band-edge channel). The band edge controller 102 can modify the first parameter information to second parameter information, the second parameter information controlling operation of the OFDM system 104 in a second mode, such as when the electronic device 100 is connected to the access point on a band edge channel. The parameter information of the OFDM parameter structure may include total bandwidth (BW), operating bandwidth (OBW), subcarrier spacing, information rate, modulation, coding rate, total subcarriers, data subcarriers, pilot subcarriers, and direct current (DC) subcarrier. The parameter information of the OFDM parameter structure can be modified by the band edge controller 102 to modify operation of the OFDM system 104 in the second mode when connected to the access point on the band edge channel. For example, the band edge controller 102 can use OFDM subcarrier nulling in the baseband domain as described in more detail below. Nulling a subset of an entire set of subcarriers reduces a Peak-to-Average Power Ratio (PAPR) level, thereby reducing out-of-band emissions by the electronic device 100 in the restricted frequency band. The band edge controller 102 can also modify a total bandwidth or an operating bandwidth in the baseband domain. This can be referred to as reduced bandwidth operations while connected on the band edge channel. The reduced bandwidth operation can reduce out-of-band emissions by the electronic device

100 in the restricted frequency band. The band edge controller 102 can modify other parameters of the OFDM system 104 in the second mode when connected to the access point on the band edge channel. The modifications to the OFDM parameter structure can be used to maintain a transmit power when connected on the band edge channel and still comply with band edge requirements.

In other embodiments, the band edge controller 102 can use dynamic power amplifier biasing in the RF domain in which the band edge controller 102 provides control information 111 to the power amplifier 110 to modify an operating bias voltage of the power amplifier 110. For example, a power management unit (PMU) can be used to provide a first operating bias voltage to the power amplifier 110 in a first state and provide a higher operating bias voltage to the power amplifier 110 in a second state. As described above, the non-linearity of the power amplifier 110 can increase out-of-band emissions. By increasing the operating bias voltage level, the linearity of the power amplifier 110 can improve to reduce spectral regrowth, reducing out-of-band emissions. The modifications to operating bias voltage level can be used to maintain a transmit power when connected on the band edge channel and still comply with band edge requirements.

As noted here, the band edge compliance requirements have resulted in reducing the transmit power on certain channels in conventional devices, which results in decreased link margin, leading to poor user experience. The band edge controller 102 can use these technical solutions to satisfy compliance requirements and maintain the required transmit power. Additional details are set forth below for the OFDM subcarrier nulling in the baseband domain, dynamic power amplifier biasing in the RF domain, and reducing bandwidth operation in the baseband domain with respect to FIGS. 2-6.

The electronic device 100 can also include additional components, such as one or more processors (e.g., a host processor or central processing unit (CPU), one or more graphic processors, input-output (I/O) devices, memory devices, storage devices, or the like. The baseband processor 106 can include additional components, such as a processing device that can executes operations to implement processing logic of the band edge controller 102. Alternatively, the band edge controller 102 can be implemented as hardware, such as a hardware state machine that receives one or more inputs, changes to one or more states based on the inputs, and outputs one or more control signals based on the current state. In some cases, the functionality of the band edge controller 102 can be integrated in or in connection with the OFDM system 104. The baseband processor 106 can include one or more interfaces, such as a serial interface like I2C interface that can be used by the band edge controller 102 to generate one or more control signals to control the OFDM system 104, the power amplifier 110, or any combination thereof. The baseband processor 106 can include one or more interfaces with a host processor to communicate status, data, whether a transmitter is active, which transmitter is active, modulation and coding scheme (MCS) information, or the like. In another embodiment, the baseband processor 106 includes an interface to a power detector circuit as described below with respect to FIG. 4. The interface can be used to send received signal strength indication (RSSI) information measured at a receiver (not illustrated), as well as sending control information to adjust an operating bias voltage level of the power amplifier 110 as described below with respect to FIG. 4.

The electronic device 100 (also referred to herein as a user device) may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, audio-input-enabled devices, speech-based personal data assistants, and the like. The electronic device 100 may also be an audio-input-enabled device, such as the Amazon Echo device, developed by Amazon Technologies, Inc. of Seattle Wash. Alternatively, the electronic device 100 may be a set-top box (STB) or other media streaming device. The electronic device may connect to a network to obtain content from a server computing system (e.g., an item providing system) or to perform other activities. The electronic device may connect to one or more different types of cellular networks. In some embodiments, the electronic device 100 connects to an access point (AP), which provides access to the Internet, a private network, or other public networks.

The electronic device 100 includes a circuit board, such as a printed circuit board (PCB) upon which one or more of the components described above is disposed. The components can be integrated into one or more integrated circuits. In some embodiments, the baseband processor 106 and the modulator 108 are separate integrated circuits or chipsets. In one embodiment, the baseband processor 106 and the modulator 108 reside on a common carrier substrate die of an integrated circuit. In other embodiments, baseband processor 106 and the modulator 108 are disposed on the PCB along with RF front-end circuitry, such as the power amplifier 110, the modulator 108, or the like. The baseband processor 106 is operable to generate RF signals to radiate electromagnetic energy via one or more antennas, such as the antenna 112. In some cases, the baseband processor 106, modulator 108, the power amplifier 110, or any combination thereof can be implemented in a RF module, such as a chipset implementing the Wi-Fi® technology. In one embodiment, the RF circuitry includes a WLAN radio and a PAN radio. In other embodiments, the RF radios may be specific to the frequency bands of interest. A processing device coupled to the baseband processor 106 may be an application processor (AP) that implements other operations of the electronic device 100. In another embodiment, an application-specific integrated circuit (ASIC), a field-programmable gate array (FPGA), or other mixed-signal integrated circuits may be used to implement the operations described herein to control operation of the OFDM system 104 when connected to another device on the band edge channel.

In one embodiment, the baseband processor 106 includes one or more transceivers that can operate at 2.45 GHz and 5 GHz. The baseband processor 106 can implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHz, 5 GHz, or both. A PAN module includes a transceiver that also operates at 2.4 GHz and may implement the Bluetooth® technology or the Zigbee® technology. The WLAN radio and PAN radio can be individual chipsets, even chipsets provided by different vendors. The WLAN radio and the PAN radio may be implemented in the same chipset or on a common carrier substrate with a processing device, such as in a System on Chip (SoC) architecture. In another embodiment, other wireless RF radios may be used to implement other technologies, such as the LTE technology, or the like. For example, the RF circuitry may include other radios, such as a wireless area network (WAN) radio, PAN radio, GNSS radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a PAN radio (e.g., Bluetooth® radio, Zigbee® radio), a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multimedia messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communication data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables functionality of both transmission and receiving data using reciprocity.

In one embodiment, the OFDM system 104 is implemented as hardware, software, firmware, or any combination thereof in a digital domain, an analog domain, or both. In other embodiments, the OFDM system 104 includes an OFDM block in a digital domain and an analog front-end in the RF domain, such as illustrated in FIG. 2.

Figure 2:
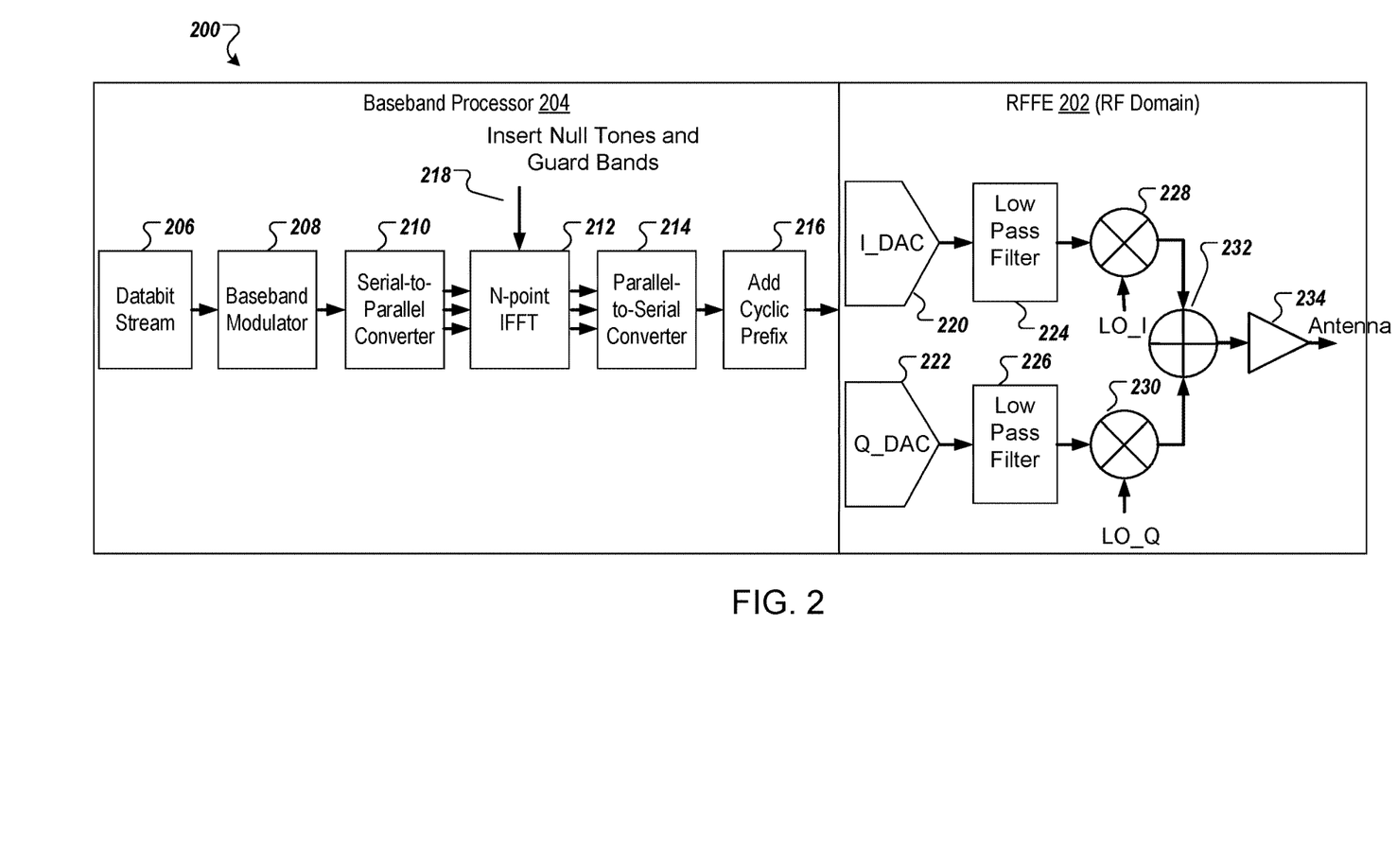
FIG. 2 is a block diagram of a radio having an OFDM block in a digital domain and an analog RF front-end in the RF domain according to one embodiment.

FIG. 2 is a block diagram of a radio having a baseband processor 204 with an OFDM block in a digital domain and an analog RF front-end 202 in the RF domain according to one embodiment. The concepts used in a simple analog OFDM implementation can be extended to the digital domain by using a combination of Fast Fourier Transform (FFT) and Inverse Fast Fourier Transform (IFFT) digital signal processing. These transforms may digitally modulated input data (data symbols) onto orthogonal subcarriers. In principle, the IFFT takes frequency-domain input data (complex numbers representing the modulated subcarriers) and converts it to the time-domain output data (analog OFDM symbol waveform). In a digitally implemented OFDM system, referred to as the OFDM block of baseband processor 204, the input bits in databit stream 206 are input into a baseband modulator 208. The input bits are grouped and mapped to source data symbols that are a complex number representing the modulation constellation point (e.g., the BPSK or QAM symbols that would be present in a single subcarrier system). The baseband modulator provides the output to a serial-to-parallel converter 210 to provide inputs to an N-point IFFT 212. These complex source symbols are treated by the transmitter as though they are in the frequency-domain and are the inputs to the N-point IFFT 212 that transforms the data into the time-domain. The N-point IFFT 212 takes in N source symbols at a time where N is the number of subcarriers in the system. Each of these N input symbols has a symbol period of T seconds. The output of the N-point IFFT 212 is N orthogonal sinusoids. These orthogonal sinusoids each have a different frequency and the lowest frequency is a direct current (DC).

The input symbols are complex values representing the mapped constellation point and therefore specify both the amplitude and phase of the sinusoid for that subcarrier. The output of the N-point IFFT 212 is the summation of all N sinusoids. Thus, the N-point IFFT 212 provides a simple way to modulate data onto N orthogonal subcarriers. The block of N output samples from the N-point IFFT 212 make up a single OFDM symbol. The output of the N-point IFFT 212 can be received by a parallel-to-serial converter 214 to convert the output into serial form.

After some additional processing, such as adding a cyclic prefix 216 to the output of the parallel-to-serial converter 214, the time-domain signal that results from the N-point IFFT 212 is transmitted across a radio channel (RFFE 202). Although not illustrated in FIG. 2, at a receiver, an FFT block is used to process the received signal and bring it into the frequency domain which is used to recover the original data bits.

For example, an 802.11a OFDM carrier signal (burst type) is the sum of one or more OFDM symbols each comprised of 52 orthogonal subcarriers, with baseband data on each subcarrier being independently modulated using quadrature amplitude modulation (available formats: BPSK, QPSK, 16-QAM, or 64-QAM). This composite baseband signal is used to modulate a main RF carrier. To begin the OFDM signal creation process, the input data bit stream is encoded with convolutional coding and Interleaving. Each data stream is divided into groups of "n" bits (1 bit-BPSK, 2 bits-QPSK, 4 bits-16QAM, or 6 bits-64QAM) and converted into complex numbers (I+jQ) representing the mapped constellation point. Note that the bit-rate will be different depending on the modulation format, a 64-QAM constellation (6 bits at a time) can have a bit rate of 54 Mbps while a QPSK constellation (2 bits at time) may only be 12 Mbps. Then 52 bins of the N-point IFFT 212 are loaded. The 48 bins contain the constellation points which are mapped into frequency offset indexes ranging from −26 to +26, skipping 4 Pilot bins, corresponding to four pilot subcarriers, and zero bin corresponding to a DC subcarrier. For example, there can be four pilot subcarriers inserted into frequency offset index locations −21, −7, +7, and +21. The zero bin is the Null or DC subcarrier and is not used; it contains a 0 value (0+j0). As described herein, in some embodiments, additional subcarriers can be nulled in addition to the DC subcarrier. To do so, null tones and guard bands are inserted as inputs 218 into the N-point IFFT 212.

When the N-point IFFT 212 is completely loaded, the Inverse FFT is computed, giving a set of complex time-domain samples representing the combined OFDM subcarrier waveform. The samples can be clocked out at 20 Msps to create a 3.2 µs (20 Msps/64) duration OFDM waveform, for example. To complete the OFDM symbol, a 0.8 µs duration Guard Interval (GI) is then added to the beginning of the OFDM waveform. This produces a single OFDM symbol with a time duration of 4 µs in length, (3.2 µs+0.8 µs). The process is repeated to create additional OFDM symbols for the remaining input data bits. To complete the OFDM frame structure, the single OFDM symbols are concatenated together and then appended to a 16 microsecond (µs) Preamble (used for synchronization) and a 4 µs SIGNAL symbol (provides Rate and Length information). This completes the OFDM frame and is ready to be transmitted as an OFDM Burst by the analog RF front-end 202 in the RF domain. In the illustrated embodiment, the OFDM block of the baseband processor 204 outputs the OFDM symbol waveforms as I data and Q data.

The analog RF front-end 202 in the RF domain can include two digital-to-analog converters (DACs) 220, 222, corresponding low pass filters 224, 226, mixers 228, 230, and an adder 232 coupled to a power amplifier 234. The power amplifier 234 is to be coupled to an antenna (not illustrated in FIG. 2). The DAC 220, low pass filter 224, and mixer 228 correspond to the I data and the DAC 222, low pass filter 226, and mixer 230 correspond to the Q data. The power amplifier 234 applies one or more RF signals to the antenna to communicate the data (i.e., information) to another device, such as an access point.

In one embodiment, the baseband processor (not illustrated in FIG. 2) uses a digital multi-carrier modulation scheme that defines a set of data subcarriers, a set of pilot subcarriers, and a DC subcarrier to communicate data in a same single channel. The baseband processor establishes a wireless communication link with a second device, such as an access point, using a 2.4 GHz frequency band or a 5 GHz frequency band. A modulator can be coupled to the baseband processor. The modulator can include the components illustrated and described with respect to the RFFE 202 in the analog domain in FIG. 2A. Alternatively, the modulator can include other components to modulate the OFDM symbols. The band edge controller (not illustrated in FIG. 2) determines that the electronic device is connected with the second device (e.g., access point) on a band edge channel of the 2.4 GHz frequency band or the 5 GHz frequency band. The band edge channel is a band channel that is adjacent to a restricted frequency band. The band edge controller can nulls a DC subcarrier and a subset of the set of data subcarriers when connected on the band edge channel by sending the input 218 to the N-point IFFT 212. Nulling the subset reduces a Peak-to-Average Power Ratio (PAPR) level, thereby reducing out-of-band emissions by the electronic device in the restricted frequency band. In some embodiments, the power amplifier 234 is coupled to an antenna port configured to couple to the antenna. The transmit power level can stay the same while in the first mode, as well as in the second mode in which the device is connected to an access point on a band edge channel. For example, the transmit power level can be equal to or greater than −41 dBm at the antenna port. Unlike conventional systems that throttle the transmit power when connected on a band edge channel, the embodiments described herein can maintain the transmit power level, improving the user experience. That is the transmissions of the second data in the second mode are compliant with a band edge requirement for out-of-band emissions in the restricted frequency band. In some cases, the band edge requirement is that the out-of-band emissions do not exceed 54 dBuV/m as an average limit and 74 dBuV/m as a peak limit. Alternatively, other band edge requirements can be specified and the embodiments described herein can be compliant with such requirements.

In one embodiment, the null tones and guard bands to be inserted as input 218 are specified in an OFDM parameter structure that includes parameters that controls operation of the OFDM block of the baseband processor 204 in a first mode, such as a normal operating mode. The band edge controller can change one or more of the parameters of the OFDM parameter structure to control operation of the OFDM block of the baseband processor 204 in a second mode, such as a band edge mode. The OFDM parameter structure can specify the set of subcarriers, as well as a subset of subcarriers to be nulled in the band edge mode.

In one embodiment, the OFDM block, also referred to as OFDM PHY uses a current minimum channel bandwidth to communicate the data in the same single channel. The band edge controller reduces an operating bandwidth parameter of the OFDM block from the current minimum channel bandwidth to a lower minimum channel bandwidth. In other embodiments, other parameters of the OFDM parameter structure can be modified in one or more modes of operation to change operation of the OFDM block accordingly.

In a further embodiment, the OFDM block of the baseband processor 204 can operate in connection with a power detector circuit, a successive approximately analog-to-digital converter (ADC), and a power management unit (PMU) to bias an operating bias voltage of the power amplifier 234, such as illustrated and described below with respect to FIG. 4.

In another embodiment, a first device includes the power amplifier 234, a modulator, and a baseband processor coupled to the modulator. The baseband processor includes an OFDM PHY parameter structure that includes first parameter information that controls operation of an OFDM PHY in a first mode. The baseband processor establishes a wireless communication link with a second device. The baseband processor transmits first data to the second device in the first mode using a transmit power level. The baseband processor determines that the first device is connected with the second device on a band edge channel that is adjacent to a restricted frequency band. The baseband processor modifies the first parameter information to obtain second parameter information. The second parameter information controls operation of the OFDM PHY in a second mode. The baseband processor transmits second data to the second device in the second mode using the transmit power level.

In a further embodiment, the first parameter information identifies a set of data subcarriers to be used by the OFDM PHY in the first mode and the second parameter information identifies a subset of the set of data subcarriers to be used by the OFDM PHY in the second mode, such as illustrated in FIG. 3A.

FIG. 3A illustrates a table of an OFDM PHY parameter structure 300, including a set of subcarriers in a first mode and a subset of subcarriers in a second mode according to one embodiment. The OFDM PHY parameter structure 300 includes various parameters, including for example, total bandwidth, operating bandwidth, subcarrier spacing, information rate, modulation, coding rate, total subcarriers, data subcarriers, pilot subcarriers, and DC subcarrier. The total subcarriers 302 specify a number of total carriers that are indexed according to a frequency index, such as −26 to +26. When four pilot subcarriers 304 are used, such as at −21, −7, +7, and +21 indexes, there can be 48 data subcarriers 306. The four pilot subcarriers 304 can be always BPSK and the DC subcarrier 308, which is typically put at the zero index, is null. In the first mode, the OFDM PHY parameter can includes a first number of total subcarriers, including a first number of pilot subcarriers, and a first number of data subcarriers. In the first mode, the DC subcarrier 308 is nulled. In the second mode, the OFDM PHY parameter can includes the same first number of total subcarriers, including the first number of pilot subcarriers, and a second number of data subcarriers that is less than the first number of data subcarriers. In the second mode, the DC subcarrier 308 is nulled and a third number of data subcarriers are nulled. The OFDM PHY parameter structure 300 can specifically identify which indexes should be nulled. In one embodiment, the OFDM PHY parameter structure 300 can null the data subcarriers in alternate fashion, where every other index is nulled, such as starting at −26, −24, . . . . 0, . . . +24, +26. For example, the OFDM PHY parameter structure 300 goes from 48 data subcarriers 310 in the first mode to 24 data subcarriers 312 in the second mode. In another embodiment, the OFDM PHY parameter structure 300 can null a first set of subcarriers that have a lower negative index, such as when the lower end of the single channel is near the restricted frequency band. In another embodiment, the OFDM PHY parameter structure 300 can null a second set of subcarriers that have a higher positive index, such as when the higher end of the single channel is near the restricted frequency band. In another embodiment, the OFDM PHY parameter structure 300 can null a first set of subcarriers that have a lower negative index and a second set of subcarriers that have a higher positive index concurrently. When reducing the number of subcarriers being used by nulling a subset of the subcarriers, the out-of-band emissions are reduced as described herein.

FIG. 3B illustrates a table of an OFDM PHY parameter structure 340, including a first value 342 of a minimum channel bandwidth in a first mode and a second value 344 of the minimum channel bandwidth in a second mode according to one embodiment. The OFDM PHY parameter structure 340 includes various parameters, including for example, total bandwidth, operating bandwidth, subcarrier spacing, information rate, modulation, coding rate, total subcarriers, data subcarriers, pilot subcarriers and DC subcarrier. In the depicted embodiment, the total bandwidth (also referred to as minimum channel bandwidth 342) is 20 MHz in a first mode and 10 MHz in a second mode, labeled as reduced bandwidth (RBW). The operating bandwidth 344 is 16.6 MHz in the first mode and 8.3 MHz in the second mode, labeled as reduced operating bandwidth (ROBW). As described herein, during the second mode, the minimum channel bandwidth 342 can be reduced to the second value 344 of the minimum channel bandwidth to reduce out-of-band emissions in the restricted frequency band.

In one embodiment, the OFDM PHY parameter structure 340 includes a first value 362 of a minimum channel bandwidth 362 in a first mode and a second value 364 of the minimum channel bandwidth in a second mode of an OFDM PHY according to one embodiment. The second value 364 of the minimum channel bandwidth in the second mode is less than the first value 362 of the minimum channel bandwidth in the first mode. For example, in the first mode, the first value of the minimum channel bandwidth is 20 MHz, whereas in the second mode, the second value of the minimum channel bandwidth is 10 MHz. In another embodiment, the second value of the minimum channel bandwidth is 5 MHz. Alternatively, other values for the second value of the minimum channel bandwidth may be used. While the first value 362 of the minimum channel bandwidth is being used in the first mode, there can be 52 total subcarriers, including 4 pilot subcarriers and 48 data subcarriers. While the second value 364 of the minimum channel bandwidth is being used in the second mode, there can be the same number of subcarriers as in the first mode. In other case, the number of subcarriers can also be reduced. By reducing the minimum channel bandwidth in the second mode, the out-of-band emissions are reduced as described herein.

In one embodiment, the OFDM PHY parameter structures described above can be used to control an N-point IFFT digital block, where N is equal to a number of data subcarriers. The baseband processor modifies the first parameter information to the second parameter information by inserting a specified number of null tones into the N-point IFFT digital block. In another embodiment, the indexes of specific subcarriers to be nulled can be input into the N-point IFFT digital block, such as done with the DC subcarrier. In another embodiment, the baseband processor modifies the first parameter information to the second parameter information by apply the second value of the minimum channel bandwidth to the N-point IFFT digital block. In other embodiments, the baseband processor modifies the first parameter information to the second parameter information by modifying other parameters in the OFDM PHY parameter structure.

As described herein, the band edge channel is adjacent to at least one of the following FCC Restricted Bands: the FCC Restricted Band between 2.31 GHz and 2.39 GHz; the FCC Restricted Band between 2.483 GHz and 2.5 GHz; the FCC Restricted Band between 4.5 GHz and 5.15 GHz; or the FCC Restricted Band between 5.35 GHz and 5.47 GHz. In another embodiment, the band edge channel is at least one of the following: Channel 1 of the 2.4 GHz UNII-1 band; Channel 11 of the 2.4 GHz UNIT-1 band; Channel 36 of the 5 GHz UNII-1 band; or Channel 64 of the 5 GHz UNII-1 band.

Figure 4:
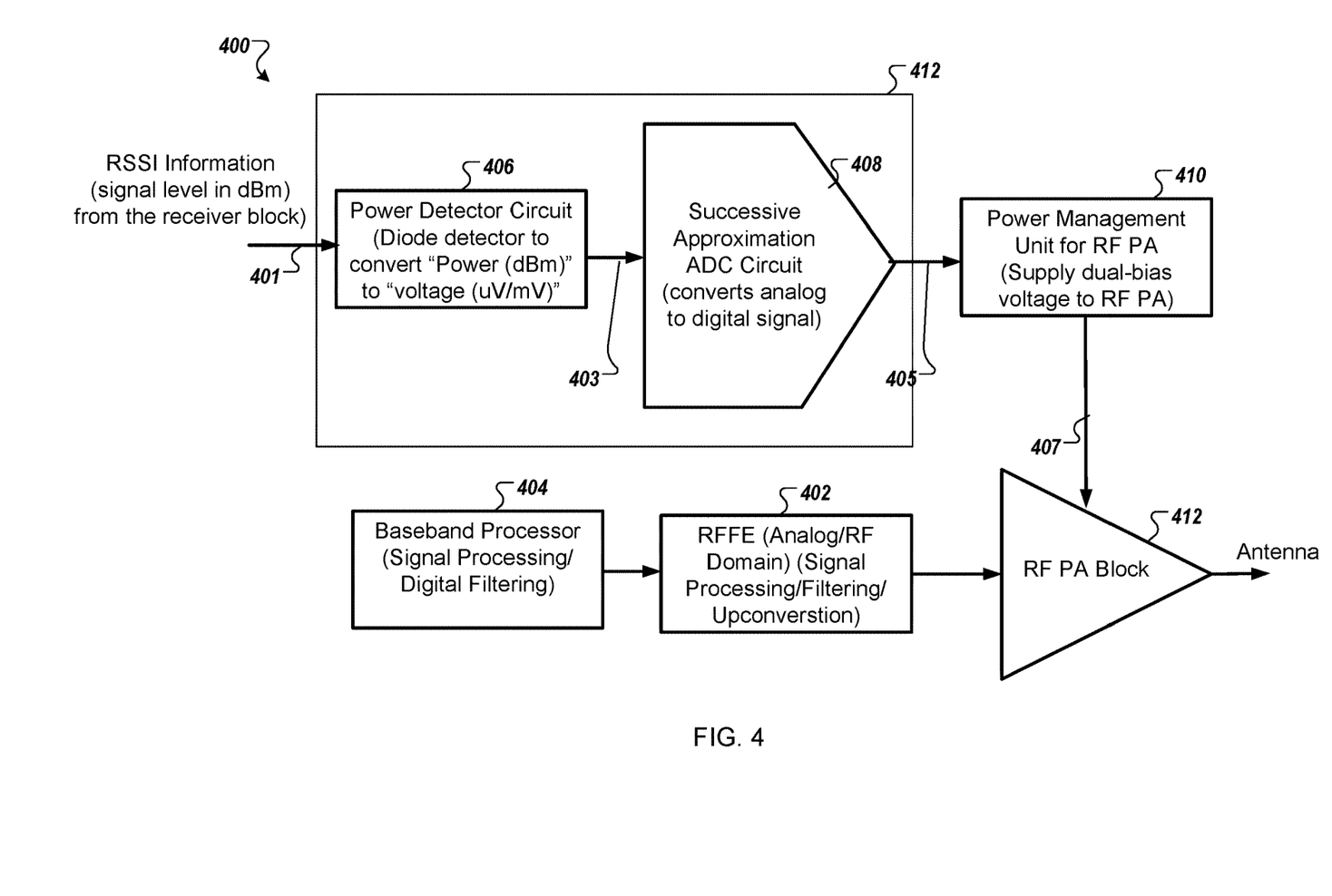
FIG. 4 is a block diagram of an electronic device having a power management unit with dynamic power amplifier biasing in an RF domain according to one embodiment.

FIG. 4 is a block diagram of an electronic device 400 having a power management unit with dynamic power amplifier biasing in an RF domain according to one embodiment. The electronic device 400 includes an analog RFFE 402 in the RF domain to perform signal processing, filtering, and up-conversion and a baseband processor 404 to perform signal processing and digital filtering. The baseband processor 404 corresponds to the baseband 106 and the RFFE 402 corresponds to the modulator 108 of FIG. 1. Alternatively, the baseband processor 404 corresponds to the baseband processor 204 and the RFFE 402 corresponds to the RFFE 202 of FIG. 2 A power amplifier block 412 is coupled to the analog RFFE 402 and an antenna (not illustrated in FIG. 4). The power amplifier block 412 corresponds to the power amplifier 110 of FIG. 1 or the power amplifier 234 of FIG. 2. The power amplifier block 412 can be controlled by the power management unit (PMU) 410. The PMU 410 can provide an operating bias voltage 407 to the power amplifier block 412. The PMU 410 can supply a dual bias voltage 407 to the power amplifier block 412, such as 3.3V output and 5V output, based on a digital logic state. In the depicted embodiment, a power detector circuit 506 is operatively coupled to receive received signal strength indicator (RSSI) information 401 from a receiver (not illustrated in FIG. 4) of the electronic device 200. The power detector circuit 406 converts the RSSI information to an analog voltage 403. The power detector circuit 406 can include a diode detector to convert power to voltage, such as a signal in dBm to uV/mV. An analog-to-digital converter (ADC) 408 is coupled to the power detector circuit 406. The ADC 408 converts the analog voltage 403 to a digital logic state 405. The ADC 408 can be a successive approximation ADC. The PMU 410 is coupled to the ADC 408 and the power amplifier block 412. The PMU 408 provides a first operating bias voltage to the power amplifier block 412 in a first state and provides a higher operating bias voltage to the power amplifier in a second state. The PMU 408 can use the digital logic state 405 from the ADC 408 to determine whether to switch from the first state to the second state to improve linearity of the power amplifier block 412 in the second state.

In one embodiment, the band edge controller 102 includes the power detector circuit 406, ADC 408, and the PMU 410.

In another embodiment, the band edge controller 102 includes the power detector circuit 406 and the ADC 408 and controls the PMU 410 to supply either the first operating bias voltage or the second operating bias voltage. In one embodiment, the PMU 410 implements a hardware state machine to determine which operating bias voltage to supply to the power amplifier block 412. In other embodiments, the functionality of the power detector circuit 406, ADC 408, and the PMU 410 can be implemented hardware, software, firmware, or any combination thereof.

In another embodiment, the ADC 408 and the power detector circuit 406 are part of a bigger amplifier biasing circuit 412 that can receive other types of inputs, such as channel state information (CSI), signal-to-noise (SNR), or the like. In such cases, additional circuit can be used to receive the CSI as a digital value, or as an analog value that can be converted to a digital value. The amplifier biasing circuit 412 can determine a biasing state based on one or more of the inputs and can output a signal to the PMU 410 to supply the appropriate bias voltage to supply to the power amplifier block 412. In another embodiment, the PMU 410 includes logic to determine which operating bias voltage to supply based on the output of the ADC 408, on the output of other circuits that measure CSI, SNR, or the like. The PMU 410 can thus receive one or more inputs to determine the appropriate biasing state.

Figure 5:
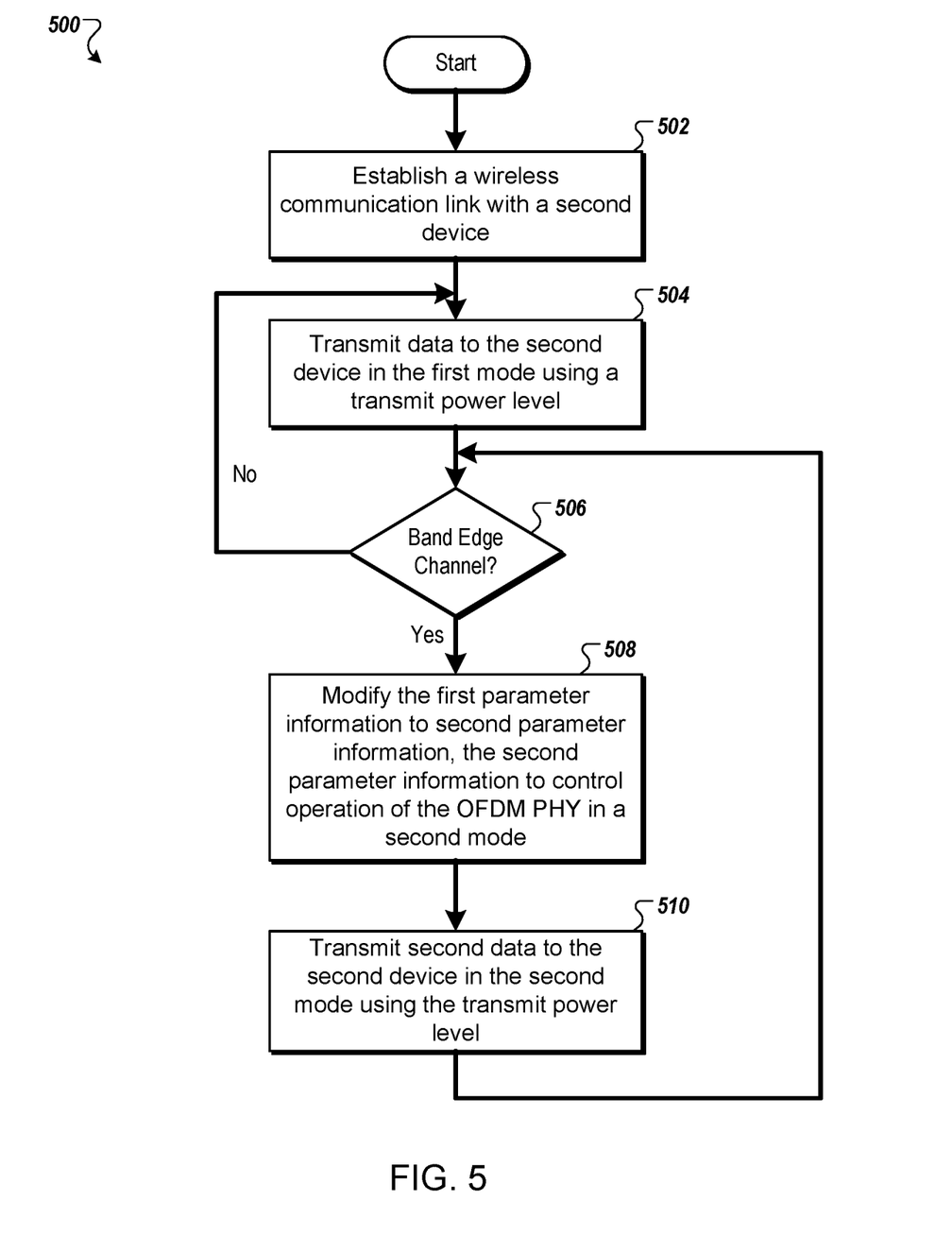
FIG. 5 is a flow diagram of a method for operating an OFDM system in a first mode and a second mode when connected on a band edge channel according to one embodiment.

FIG. 5 is a flow diagram of a method 500 for operating an OFDM system in a first mode and a second mode when connected on a band edge channel according to one embodiment. The method 500 may be implemented using processing logic comprising hardware, software, firmware, or any combination thereof. In one embodiment, the band edge controller 102 of FIG. 1 implements the method 500.

Referring to FIG. 5, the processing logic begins by establishing a wireless communication link with a second device at block 502. At block 504, the processing logic transmits first data to the second device in a first mode of the OFDM system. The processing logic can transmit the first data using a first transmit power level. For example, the OFDM system uses an OFDM PHY parameter structure that specifies first parameter information that controls operation of an OFDM PHY in the first mode. At block 506, the processing logic determines whether the device is connected with the second device on a band edge channel that is adjacent to a restricted frequency band. When the device is not connected on the band edge channel at block 506, the processing logic continues to transmit data to the second device in the first mode using the first transmit power level. When the processing logic determines that the device is connected with the second device on the band edge channel at block 506, the processing logic modifies the first parameter information to second parameter information at block 508. The second parameter information controls operation of the OFDM system in a second mode. At block 510, the processing logic transmits second data to the second device in the second mode using the transmit power level. If there is no additional data to transmit, the method 500 ends; otherwise, the processing logic returns to block 506 to determine whether the device is still connected on the band edge channel to determine whether to continue in the second mode or return to the first mode.

In one embodiment, the first parameter information identifies a set of data subcarriers to be used by the OFDM system in the first mode and the second parameter information identifies a subset of the set of data subcarriers to be used by the OFDM system in the second mode. For example, the second parameter information includes a list of subcarriers to be nulled by an N-point IFFT. In another embodiment, the first parameter information identifies a first value of a minimum channel bandwidth to be used by the OFDM system in the first mode and the second parameter information identifies a second value of the minimum channel bandwidth to be used by the OFDM system in the second mode. The second value of the minimum channel bandwidth is less than the first value of the minimum channel bandwidth.

In another embodiment, the processing logic determines a digital logic state based on RSSI information as described herein. For example, a receiver determines the RSSI information, a power detector circuit converts the RSSI information to an analog voltage, and a successive approximation ADC converts the analog voltage to the digital logic state. The processing logic can determine whether to switch from the first state to the second state and supply either a first operating bias voltage to the power amplifier in the first state and provides a higher operating bias voltage to the power amplifier in the second state.

In one embodiment, at block 508, the processing logic inserts a specified number of null tones into an N-point IFFT digital block, where N is equal to a number of data subcarriers. In another embodiment, the processing logic at block 508 applies the second value of the minimum channel bandwidth to the N-point IFFT digital block.

Figure 6:
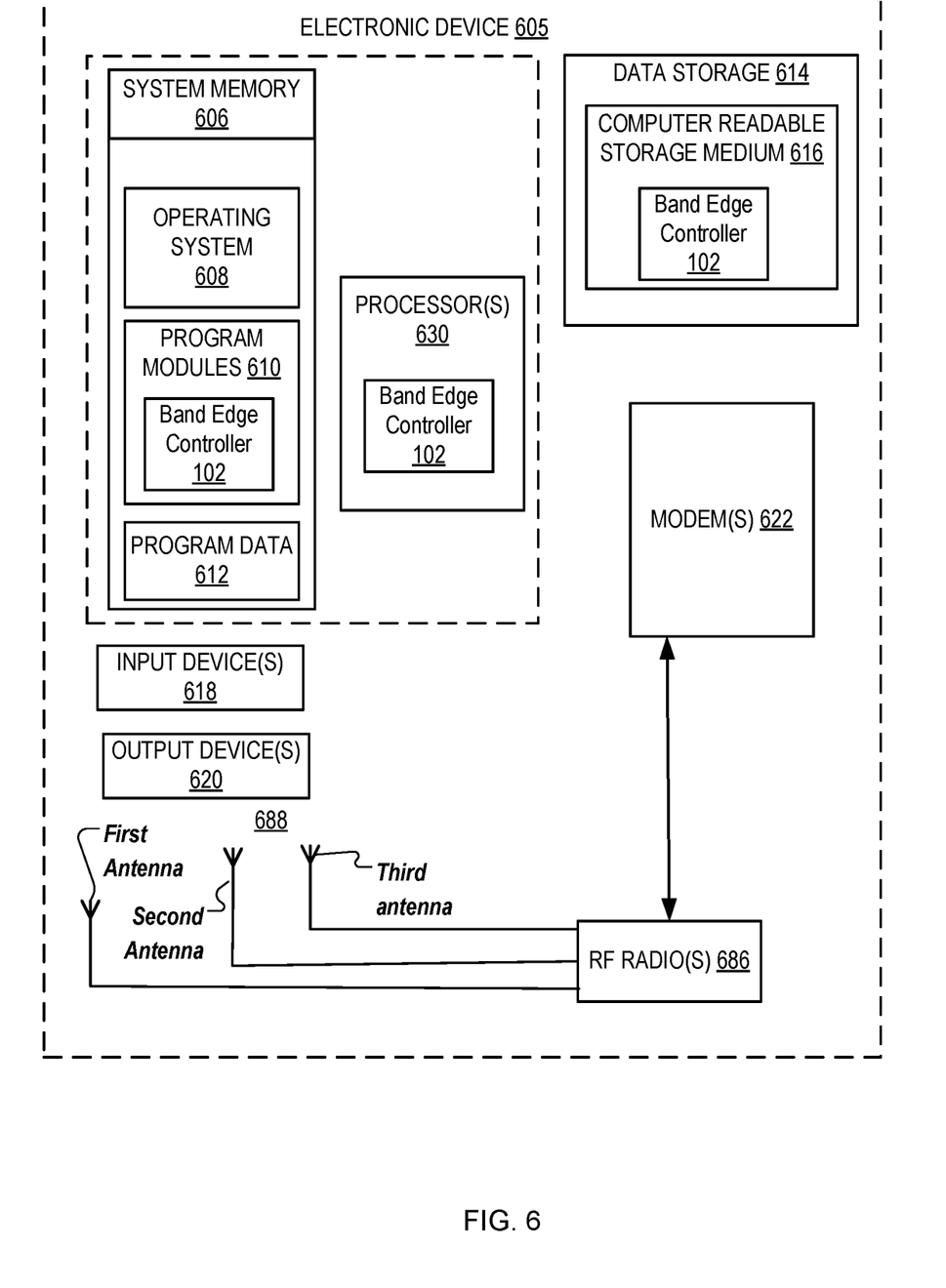
FIG. 6 is a block diagram of an electronic device in which embodiments of AIC may be implemented.

FIG. 6 is a block diagram of an electronic device 605 in which embodiments of AIC may be implemented. The electronic device 605 may correspond to the electronic device 100 of FIG. 1 or electronic device 200 of FIG. 2 or electronic device 400 of FIG. 4. The electronic device 605 may be any type of computing device such as an electronic book reader, a PDA, a mobile phone, a laptop computer, a portable media player, a tablet computer, a camera, a video camera, a netbook, a desktop computer, a gaming console, a DVD player, Bluray® player, a computing pad, a media center, an audio-input-enabled device, a speech-based personal data assistant, and the like. The electronic device 605 may be any portable or stationary user device. For example, the electronic device 605 may be an intelligent voice control and speaker system. Alternatively, the electronic device 605 can be any other device used in a WLAN network (e.g., Wi-Fi® network), a WAN network, or the like.

The electronic device 605 includes one or more processor(s) 630, such as one or more CPUs, microcontrollers, field programmable gate arrays, or other types of processing devices. The electronic device 605 also includes system memory 606, which may correspond to any combination of volatile and/or non-volatile storage mechanisms. The system memory 606 stores information that provides operating system component 608, various program modules 610 such as the band edge controller 102 described herein, program data 612, and/or other components. In one embodiment, the system memory 606 stores instructions of the methods as described herein. The electronic device 605 performs functions by using the processor(s) 630 to execute instructions provided by the system memory 606.

The electronic device 605 also includes a data storage device 614 that may be composed of one or more types of removable storage and/or one or more types of non-removable storage. The data storage device 614 includes a computer-readable storage medium 616 on which is stored one or more sets of instructions embodying any of the methodologies or functions described herein, such as the band edge controller 102 described herein. Instructions for the program modules 610 may reside, completely or at least partially, within the computer-readable storage medium 616, system memory 606 and/or within the processor(s) 630 during execution thereof by the electronic device 605, the system memory 606 and the processor(s) 630 also constituting computer-readable media. The electronic device 605 may also include one or more input devices 618 (keyboard, mouse device, specialized selection keys, etc.) and one or more output devices 620 (displays, printers, audio output mechanisms, etc.).

The electronic device 605 further includes a modem 622 to allow the electronic device 605 to communicate via a wireless network (e.g., such as provided by the wireless communication system) with other computing devices, such as remote computers, an item providing system, and so forth. The modem 622 can be connected to one or more radios 686 686. The radios may include a WLAN radio, a WAN radio, PAN radio, or the like, as described herein. Antennas 688 are coupled to the radios 686, which are coupled to the modem 622. The antennas 688 may include a first WLAN antenna and a second WLAN antenna, and PAN antenna as described herein. Additional antennas may be used and may be GPS antennas, NFC antennas, other WAN antennas, WLAN or PAN antennas, or the like. The modem 622 allows the electronic device 605 to handle both voice and non-voice communications (such as communications for text messages, multimedia messages, media downloads, web browsing, etc.) with a wireless communication system. The modem 622 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 622 may generate signals and send these signals to antennas 688, via RF radio(s) 686 as descried herein. Electronic device 605 may additionally include a WLAN radio, a GPS receiver, a PAN transceiver, and/or other RF radios. These RF radios may additionally or alternatively be connected to one or more of antennas 688. Antennas 688 may be configured to transmit in different frequency bands and/or using different wireless communication protocols. The antennas 688 may be directional, omnidirectional, or non-directional antennas. In addition to sending data, antennas 688 may also receive data, which is sent to appropriate RF radios connected to the antennas.

In one embodiment, the electronic device 605 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 622 is shown to control transmission and reception via antenna 688, the electronic device 605 may alternatively include multiple modems, each of which is configured to transmit/receive data via a different antenna and/or wireless transmission protocol.

The electronic device 605 delivers and/or receives items, upgrades, and/or other information via the network. For example, the electronic device 605 may download or receive items from an item providing system. The item providing system receives various requests, instructions and other data from the electronic device 605 via the network. The item providing system may include one or more machines (e.g., one or more server computer systems, routers, gateways, etc.) that have processing and storage capabilities to provide the above functionality. Communication between the item providing system and the electronic device 605 may be enabled via any communication infrastructure. One example of such an infrastructure includes a combination of a wide area network (WAN) and wireless infrastructure, which allows a user to use the electronic device 605 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the electronic device 605.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices 605 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 605 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
   a baseband processor comprising:
     an Orthogonal Frequency Division Multiplexing (OFDM) physical layer, wherein the OFDM physical layer uses a digital multi-carrier modulation scheme that defines a set of data subcarriers, a set of pilot subcarriers, and a direct current (DC) subcarrier to communicate data in a same single channel; and
     a band edge controller coupled to the OFDM physical layer;
   a modulator coupled to the baseband processor; and
   a power amplifier coupled to the modulator, the power amplifier to apply a radio frequency (RF) signal to an antenna to communicate the data to an access point, wherein the band edge controller determines that the electronic device is connected with an access point on a band edge channel of a 2.4 GHz frequency band or a 5 GHz frequency band, wherein the band edge channel is a channel that is adjacent to a restricted frequency band, wherein the band edge controller nulls a direct current (DC) subcarrier and nulls a subset of the set of data subcarriers when connected on the band edge channel, wherein nulling the subset reduces a Peak-to-Average Power Ratio (PAPR) level thereby reducing out-of-band emissions by the electronic device in the restricted frequency band.

2. The electronic device of claim 1, wherein the band edge controller comprises:
   a power detector circuit configured to receive received signal strength indicator (RSSI) information from a receiver of the electronic device and convert the RSSI information to an analog voltage, wherein the receiver receives data from the access point and the RSSI information is indicative of a distance between the power detector circuit and the access point;
   an analog-to-digital converter (ADC) coupled to the power detector circuit, wherein the ADC converts the analog voltage to a digital logic state that corresponds to either a first state or a second state, wherein the second state corresponds to when the electronic device is connected with the access point on the band edge channel; and
   a power management unit (PMU) coupled to the ADC and the power amplifier, wherein the PMU provides a first operating bias voltage to the power amplifier in the first state and provides a second operating bias voltage that is higher than the first operating bias voltage to the power amplifier in the second state, wherein the PMU uses the digital logic state to determine whether to switch from the first state to the second state to improve linearity of the power amplifier in the second state.

3. The electronic device of claim 1, wherein the OFDM physical layer uses a first value for a minimum channel bandwidth parameter of the OFDM physical layer to communicate the data in the same single channel, wherein the band edge controller reduces the first value to a second value for the minimum channel bandwidth parameter an operating bandwidth parameter of the OFDM physical layer.

4. A device comprising:
a power amplifier;
a modulator coupled to the power amplifier; and
a baseband processor coupled to the modulator, the baseband processor comprising an Orthogonal Frequency Division Multiplexing (OFDM) physical layer (PHY) parameter structure, wherein the OFDM PHY parameter structure comprises first parameter information that controls operation of an OFDM PHY in a first mode, wherein the baseband processor is to:
establish a wireless communication link with a second device;
transmit first data to the second device in the first mode using a transmit power level;
determine that the device is connected with the second device on a band edge channel that is adjacent to a restricted frequency band;
modify the first parameter information to second parameter information; and
transmit second data to the second device in a second mode using the transmit power level and the second parameter information.

5. The device of claim 4, wherein the first parameter information identifies a set of data subcarriers to be used by the OFDM PHY in the first mode and the second parameter information identifies a subset of the set of data subcarriers to be used by the OFDM PHY in the second mode.

6. The device of claim 4, wherein the first parameter information identifies a first value of a minimum channel bandwidth to be used by the OFDM PHY in the first mode and the second parameter information identifies a second value of the minimum channel bandwidth to be used by the OFDM PHY in the second mode, wherein the second value of the minimum channel bandwidth is less than the first value of the minimum channel bandwidth.

7. The device of claim 4, further comprising:
a power detector circuit coupled to receive channel information from a receiver;
an successive approximation analog-to-digital converter (ADC) coupled to the power detector circuit, wherein the successive approximation ADC converts an analog voltage to a digital logic state; and
a power management unit (PMU) coupled to the power detector circuit and the power amplifier, wherein the PMU determines a first state using the channel information and provides a first operating bias voltage to the power amplifier in the first state and determines a second state using the channel information and provides a higher operating bias voltage to the power amplifier in the second state.

8. The device of claim 7, further comprising an analog-to-digital converter (ADC) coupled between the power detector circuit and the PMU, wherein the channel information includes a received signal strength indicator (RSSI information) and the power detector circuit converts the RSSI information to an analog voltage, and wherein the ADC converts the analog voltage to a digital logic state, wherein the PMU compares the RSSI information to a threshold to determine the first state or the second state.

9. The device of claim 7, wherein the channel information comprises a channel state information (CSI) value, wherein the PMU compares the CSI value to a threshold to determine the first state or the second state.

10. The device of claim 4, wherein the OFDM PHY comprises an N-point Inverse Fast Fourier Transform (IFFT) digital block, where N is equal to a number of data subcarriers, wherein the baseband processor, to modify the first parameter information to the second parameter information, inserts a specified number of null tones into the N-point IFFT digital block.

11. The device of claim 4, wherein the OFDM PHY comprises an N-point Inverse Fast Fourier Transform (IFFT) digital block, where N is equal to a number of data subcarriers, wherein the baseband processor, to modify the first parameter information to the second parameter information, provides a second value of a minimum channel bandwidth to the N-point IFFT digital block in the second mode, wherein the second value is less than a first value of the minimum channel bandwidth used by the OFDM PHY in the first mode.

12. The device of claim 4, wherein the band edge channel is adjacent to at least one of:
a first band between 2.31 GHz and 2.39 GHz;
a second band between 2.483 GHz and 2.5 GHz;
a third between 4.5 GHz and 5.15 GHz; or
a fourth band between 5.35 GHz and 5.47 GHz.

13. The device of claim 4, wherein the band edge channel is at least one of:
Channel 1 of the 2.4 GHz ISM band;
Channel 11 of the 2.4 GHz ISM band;
Channel 36 of the 5 GHz UNII-1 band; or
Channel 64 of the 5 GHz UNII-1 band.

14. The device of claim 4, wherein transmissions of the second data are compliant with a band edge requirement for out-of-band emissions in the restricted frequency band.

15. A device comprising:
a receiver;
a power amplifier;
a modulator coupled to the power amplifier;
a baseband processor coupled to the modulator;
a biasing voltage circuit to receive at least one of received signal strength indicator (RSSI) value, a channel state information (CSI) value, a signal-to-noise (SNR) value and output a band channel state of the device; and
a power management unit (PMU) coupled to the biasing voltage circuit, wherein the PMU:
determines a first state using the band channel state;
provides a first operating bias voltage to the power amplifier in the first state;
determines a second state using the band channel state; and
provides a second operating bias voltage to the power amplifier in the second state, wherein the second operating bias voltage is higher than the first operating bias voltage.

16. The device of claim 15, wherein the baseband processor is to:
establish a wireless communication link with a second device;
determine that the device is connected with the second device on a band edge channel that is adjacent to a restricted frequency band; and
provide a band edge channel state to the PMU, wherein the PMU uses the band edge channel state to determine whether to switch from the first state to the second state.

17. The device of claim 16, wherein the baseband processor is to:

determine that the device is connected with the second device on a channel that is not adjacent to the restricted frequency band; and provide a channel state to the PMU, wherein the PMU uses the channel state to determine whether to switch from the second state to the first state.

18. The device of claim 15, wherein the baseband processor comprises an Orthogonal Frequency Division Multiplexing (OFDM) physical layer (PHY) that uses a digital multi-carrier modulation scheme that defines a set of data subcarriers, a set of pilot subcarriers, and a direct current (DC) subcarrier to communicate data in a same single channel, wherein the baseband processor is further to:

establish a wireless communication link with a second device;

determine that the device is connected with the second device on a band edge channel that is adjacent to a restricted frequency band;

null the DC subcarrier; and null a subset of the set of data subcarriers.

19. The device of claim 15, wherein the baseband processor comprises an Orthogonal Frequency Division Multiplexing (OFDM) physical layer (PHY) parameter structure, wherein the OFDM PHY layer parameter structure comprises first parameter information that identifies a first value of a minimum channel bandwidth to be used by an OFDM PHY in a first mode, wherein the baseband processor is further to:

establish a wireless communication link with a second device;

transmit first data to the second device in the first mode;

determine that the device is connected with the second device on a band edge channel that is adjacent to a restricted frequency band;

modify the first value of the minimum channel bandwidth to a second value of the minimum channel bandwidth to be used by the OFDM PHY in a second mode, wherein the second value of the minimum channel bandwidth is lower than the first value of the minimum channel bandwidth; and transmit second data to the second device in the second mode.

20. The device of claim 15, wherein the baseband processor comprises an Orthogonal Frequency Division Multiplexing (OFDM) physical layer (PHY) having an N-point Inverse Fast Fourier Transform (IFFT) digital block, where N is equal to a number of data subcarriers, wherein the baseband processor is further to:

establish a wireless communication link with a second device;

determine that the device is connected with the second device on a band edge channel that is adjacent to a restricted frequency band; and insert a specified number of null tones into the N-point IFFT digital block when the device is connected on the band edge channel.

* * * * *